United States Patent
Dietz

(10) Patent No.: US 6,385,586 B1
(45) Date of Patent: May 7, 2002

(54) SPEECH RECOGNITION TEXT-BASED LANGUAGE CONVERSION AND TEXT-TO-SPEECH IN A CLIENT-SERVER CONFIGURATION TO ENABLE LANGUAGE TRANSLATION DEVICES

(75) Inventor: Timothy Alan Dietz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,799

(22) Filed: Jan. 28, 1999

(51) Int. Cl.$^7$ ............................................. G10L 15/00
(52) U.S. Cl. ........................ 704/277; 704/260; 704/251
(58) Field of Search ................................ 704/277, 231, 704/2–4, 8, 235, 246, 251, 260

(56) References Cited

U.S. PATENT DOCUMENTS

| | | | |
|---|---|---|---|
| 4,882,681 A | * 11/1989 | Brotz | 704/3 |
| 5,373,441 A | * 12/1994 | Hirai et al. | 704/2 |
| 5,384,701 A | * 1/1995 | Stentiford et al. | 704/3 |
| 5,640,575 A | * 6/1997 | Maruyama et al. | 704/4 |
| 5,875,422 A | * 2/1999 | Eslambolchi et al. | 704/3 |
| 6,161,082 A | * 12/2000 | Goldberg et al. | 704/3 |
| 6,173,250 B1 | * 1/2001 | Jong | 704/3 |
| 6,175,819 B1 | * 1/2001 | Van Alstine | 704/235 |
| 6,182,026 B1 | * 1/2001 | Tillmann et al. | 704/2 |
| 6,233,544 B1 | * 5/2001 | Akshawi | 704/2 |

* cited by examiner

Primary Examiner—William Korzuch
Assistant Examiner—Daniel Abebe
(74) Attorney, Agent, or Firm—Leslie A. Van Leeuwen; Bracewell & Patterson, L.L.P.

(57) ABSTRACT

A method for dynamically providing language translations of a human utterance from a first human language into a second human language. A human utterance is captured in a first human language utilizing a speech input device. The speech input device is then linked to a server created from components including a data processing system equipped with software enabled speech recognition environment and a language translation environment. A desired second human language is then selected for said first human language to be translated into. Following this selection, the captured human utterance is transmitted to the server where it is converted into text utilizing the speech recognition engine of the server which instantiates the translation of the text from the first human language into the desired second human language. Finally, an output is provided of the captured human utterance in its desired second human language.

30 Claims, 3 Drawing Sheets

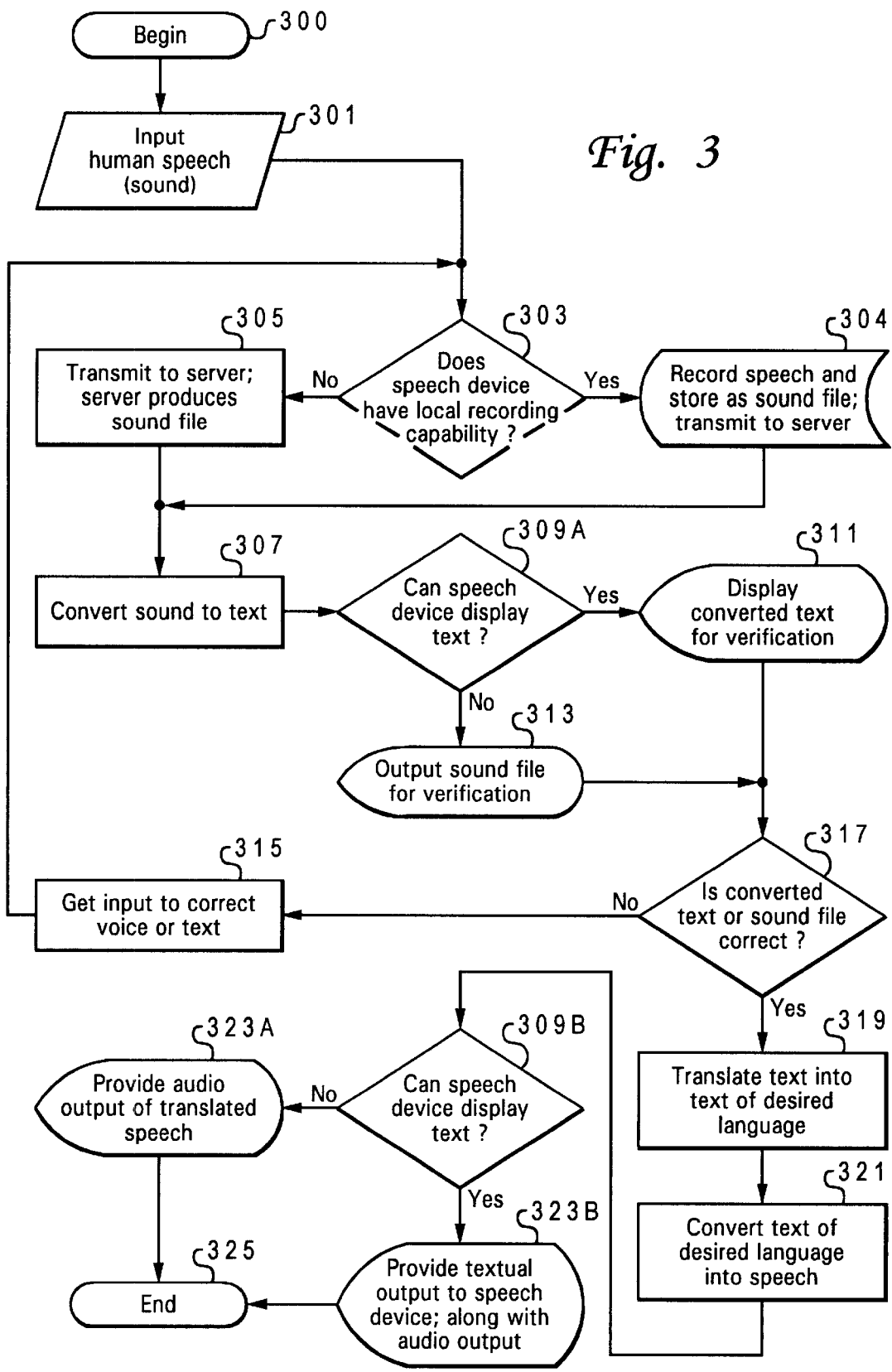

US 6,385,586 B1

SPEECH RECOGNITION TEXT-BASED LANGUAGE CONVERSION AND TEXT-TO-SPEECH IN A CLIENT-SERVER CONFIGURATION TO ENABLE LANGUAGE TRANSLATION DEVICES

BACKGROUND OF THE INVENTION

1. Technical Field

The present invention relates in general to speech communication, and in particular to a method and system for improving speech communication in foreign languages. Still more particularly, the present invention relates to a method and system for providing a language translation environment on a data processing system to improve speech communication in foreign languages.

2. Description of the Related Art

Human speech communication is often very complex, particularly when it involves communicating with someone who speaks a different language. As the world quickly evolves more and more, like a global city, with many people visiting foreign countries or conducting business with foreign partners communication in other languages becomes increasingly common. A need exists for fast and easily accessed translation environments.

Traditionally, language translation was conducted via the services of a human translator. Utilization of a human translator is rather costly and is now out-moded. Additionally, it is often difficult to find a translator on the spur of the moment which is when most translation is needed. In today's fast paced environment, individuals cannot wait around until a translator is found to communicate.

Modern technological advancement has provided us with machine translators. Machine translators are typically data processing systems configured for translation utilizing language translation software. AltaVista (™) Translation utilizing Systran technology is one of the more common web locations which provide a language translation service. AltaVista's Translation Assistant provides a free service to the Internet community. Systran, a leader in the field of machine translations, provides a machine translation of the message received from one language to another selected language. Systran Software, Inc. is a leading developer of natural language machine translation, having developed 28 language pairs. Machine translators translate only in text form, since most current language translation applications operate with ASCII text files. Therefore, all speech communication must first be converted to text before it can be translated.

Human speech voice recognition technology has been around for more than several years and is well known in the art and commercially available. Speech analysis and speech recognition algorithms, machines, and devices are becoming more and more common. Such systems have become increasingly powerful and less expensive. Those familiar with the technology are aware that various applications exist which recognize human speech and store it in various forms on a data processing system. One extension of this technology is in speech-to-text application which provides a textual representation on a data processing system of human speech.

Speech-to-text applications have evolved as one of the major goals of speech recognition technology. Many current applications utilize this technology to convert spoken language into text form which is then made accessible to a user on a data processing system.

Some common examples of the implementation of voice recognition and speech to text technology are Dragon™ (a product of COREL) and ViaVoice™ and IBM Voicetype™, both products of International Business Machines Corporation (IBM).

ViaVoice 98 Executive Edition is IBM's most powerful continuous speech software. The ViaVoice Executive 98 software package offers direct dictation into most popular Windows applications, voice navigation of your desktop and applications and the utilization of intuitive "natural language commands" for editing and formatting Microsoft Word documents.

Outputting of human speech in other than text form is also often desired. This has led to the creation of text-to-speech applications and related technological advancements. The converse of voice recognition is voice synthesizing wherein a user of a data processing system outputs a human speech signal. Human speech generation is quickly developing and is also well known in the art. In text-to speech applications, a speech synthesizer provides a computer with the ability to speak. Users and applications provide text to a speech synthesizer, which is then converted to audio.

A machine which can rapidly and automatically translate languages, particularly speech has been sought for many years. Local devices have been developed to allow instant language translations; however, attempting to put all of the capabilities of a translation environment into a local device is not feasible. Additionally, local devices tend to be huge and cumbersome and rather inefficient for someone on the go. They also have low capacity. Laptops are examples of possible local devices, however laptops are also cumbersome and tend to be rather expensive.

Most machine translation packages have been designed as an aid for professional translations, and produce outputs which have to be post edited before being presentable in their target languages. Most packages operate in a slow batch processing mode, neither of which is suitable for real time speech operation.

Many times there is a need to communicate in languages we do not speak or write, e.g. to ask directions, order food or communicate an illness or accident while traveling. A language capture device that could tie into a language translation environment with more power, capabilities and the ability to improve as better technology evolved would be much better.

It is therefore desirable to have a language capture device and system that allows for near instantaneous translation of voice inputs (speech) to enable efficient communication in a foreign language. It is further desirable to have such a device which is easily transportable and relatively inexpensive.

SUMMARY OF THE INVENTION

It is therefore one object of the present invention to provide improved speech communication.

It is another object of the present invention to provide a method and system for improved speech communication in foreign languages.

It is yet another object of the present invention to provide a method and system for providing a language translation environment on a data processing system to improve speech communication in foreign languages.

The foregoing objects are achieved as is now described. A method is disclosed for dynamically providing language translations of a human utterance from a first human language into a second human language. The method first captures the human utterance in a first human language utilizing a speech input device. The speech input device is then linked to a server created from components including a data processing system equipped with software enabled speech recognition environment and language translation environment. A desired second human language is then selected for said first human language to be translated into. Following this selection, the captured human utterance is transmitted to the server where it is converted into text utilizing the speech recognition engine of the server which instantiates the translation of the text from the first human language into the desired second human language. Finally, an output is provided of the captured human utterance in its desired second human language.

In one embodiment of the invention, a default second human language is selected based on global positioning system (GPS) data from the speech input devices equipped with GPS technology. This default language may be overridden by a user.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a flow chart illustrating the logic flow of the processes involved in the invention in accordance with the preferred embodiment of the present invention.

DETAILED DESCRIPTION OF AN ILLUSTRATIVE EMBODIMENT

Figure 1:
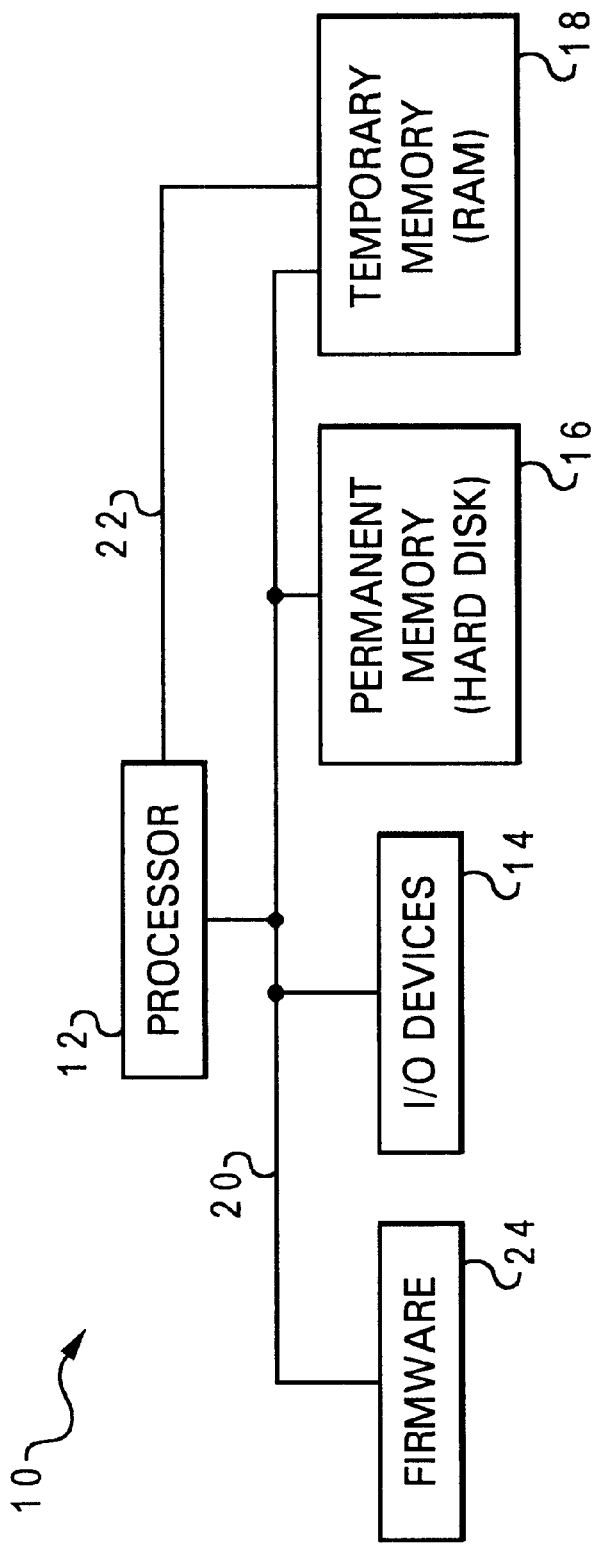
FIG. 1 is a diagram of a data processing system utilized as a server in the preferred embodiment of the present invention.

With reference now to the figures, and in particular with reference to FIG. 1, there is depicted the basic structure of a data processing system 10 utilized as a server in the preferred embodiment of the invention. Data processing system 10 has at least one central processing unit (CPU) or processor 12 which is connected to several peripheral devices, including input/output devices 14 (such as a display monitor, keyboard, and graphical pointing device) for user interface, a permanent memory device 16 (such as a hard disk) for storing the data processing system's operating system and user programs/applications, and a temporary memory device 18 (such as random access memory or RAM) that is utilized by processor 12 to implement program instructions. Processor 12 communicates with the peripheral devices by various means, including a bus 20 or a direct channel 22 (more than one bus may be provided utilizing a bus bridge).

Data processing system 10 may have many additional components which are not shown such as serial, parallel, and USB ports for connection to, e.g., modems or printers. In the preferred embodiment of the invention, communication to the data processing system is made possible via a modem connected to a land line (telephone system) or wireless line. Those skilled in the art will recognize that other methods of communicating to data processing systems are possible. Additionally, data processing system may be connected to a local or nonlocal network. Communicated speech data arrives at the modem or network card and is processed to be received by the data processing system's CPU or other software application.

Those skilled in the art will further appreciate that there are other components that might be utilized in conjunction with those shown in the block diagram of FIG. 1; for example, a display adapter connected to processor 12 might be utilized to control a video display monitor, and a memory controller may be utilized as an interface between temporary memory device 18 and processor 12. Data processing system 10 also includes firmware 24 whose primary purpose is to seek out and load an operating system from one of the peripherals (usually permanent memory device 16) whenever the data processing system is first turned on. In the preferred embodiment, data processing system contains a relatively fast CPUs along with sufficient memory and hard drive/disk space and other required hardware components necessary for providing almost instantaneous translations of an incoming communication. Data processing system operates as a server in the preferred embodiment and is further capable of handling multiple tasks simultaneously to allow for multiple application of the invention simultaneous without delays or queues. Servers may entail a more complex system with additional hardware components to communicate with objects. Servers also may include multiple processor systems which can handle multiple inputs and outputs simultaneously.

This invention implements the utilization of speech recognition, text-based language conversion and text-to-speech in a client-server configuration to enable language translation devices. The invention works by first capturing the speaker's native language and the desired translation language (optionally determined by global positioning system (GPS) data if the translation device was portable and equipped with a GPS receiver device) and converting it to a sound file of high fidelity. Transmission of the data to a more powerfully equipped server would then occur. A commercially available server-based speech recognition engine would then render the speech to text.

In the preferred embodiment of the invention, the speech input device is also a GPS satellite data receiver. GPS technology was initially designed for utilization by the United States military but is now being utilized in commercial applications such as this invention. GPS technology allows a receiver to determine the position on the earth's surface where it currently resides. Utilizing this technology, the speech input device would send the location to the server which can then determine the default translate to language based on the server's determination of the country in which the device is being utilized. In the preferred embodiment, this language is set as the default language. A user is then provided with the option of overriding/changing the default language, if necessary. When a request is made from, for illustrative purposes, Brazil, a signal is sent back to the server indicating the geographical location of the signal. The server then accesses its database and determines that the native language is Portuguese. The translated text is then presented to the user in Portuguese by default unless the user selects a different language. Those skilled in the art can appreciate the implementation of the present invention utilizing GPS technology.

In the preferred embodiment, a related fast recognition software, e.g., IRM's ViaVoice technology is utilized to provide the voice-to-text environment. optionally, to assure accurate recognition of spoken languages, the speaker is prompted for verification either with a text or audio output, depending on the local device capabilities, once the initial recognition is completed on the server and a text file is available to be send back or spoken utilizing text-to-speech technology. So that a user can be sure that the correct phrase will be output in the target language, the system indicates what phrase in the input language it will translate. In order to be able to do this, the system is provided with a store holding the full repertoire of phrases in the input language. Once accurate recognition is assured, then the text can be translated into the desired language. At this point, again depending on the capabilities of the requesting device, either text could be sent back to be displayed, or additional text-speaking software such as a commercially available text-to-speech application Java Speech Markup Language (JSML) via Java Speech Application Program Interface (JSAPI) could produce a sound file via a voice synthesizer the portable device could play or display the returned message for the person they are trying to communicate with.

In the preferred embodiment of the present invention, this capability is implemented via the utilization of digital or analog cellular phones in areas where the transmission quality is good. Cellular phones are utilized as the speech input devices for speech input and output and are configured for voice capture and transmission and text display. These cellular phones operate via a wireless transfer of information. Those skilled in the art are familiar with cellular phone and wireless technology and can appreciate its applications in the present invention. Services incorporating the approach outlined above are made available via special phone numbers with users billed for connect time. These numbers access the server directly from any location in the world.

Preferably in the system the phrases, once correctly recognized, are stored as ASCII text, since that reduces the storage requirement very considerably compared to that needed for conventional speech/sound file storage. Where speech output is required, the text is retrieved from store and passed to a text to speech converter and speech synthesizer.

Figure 2:
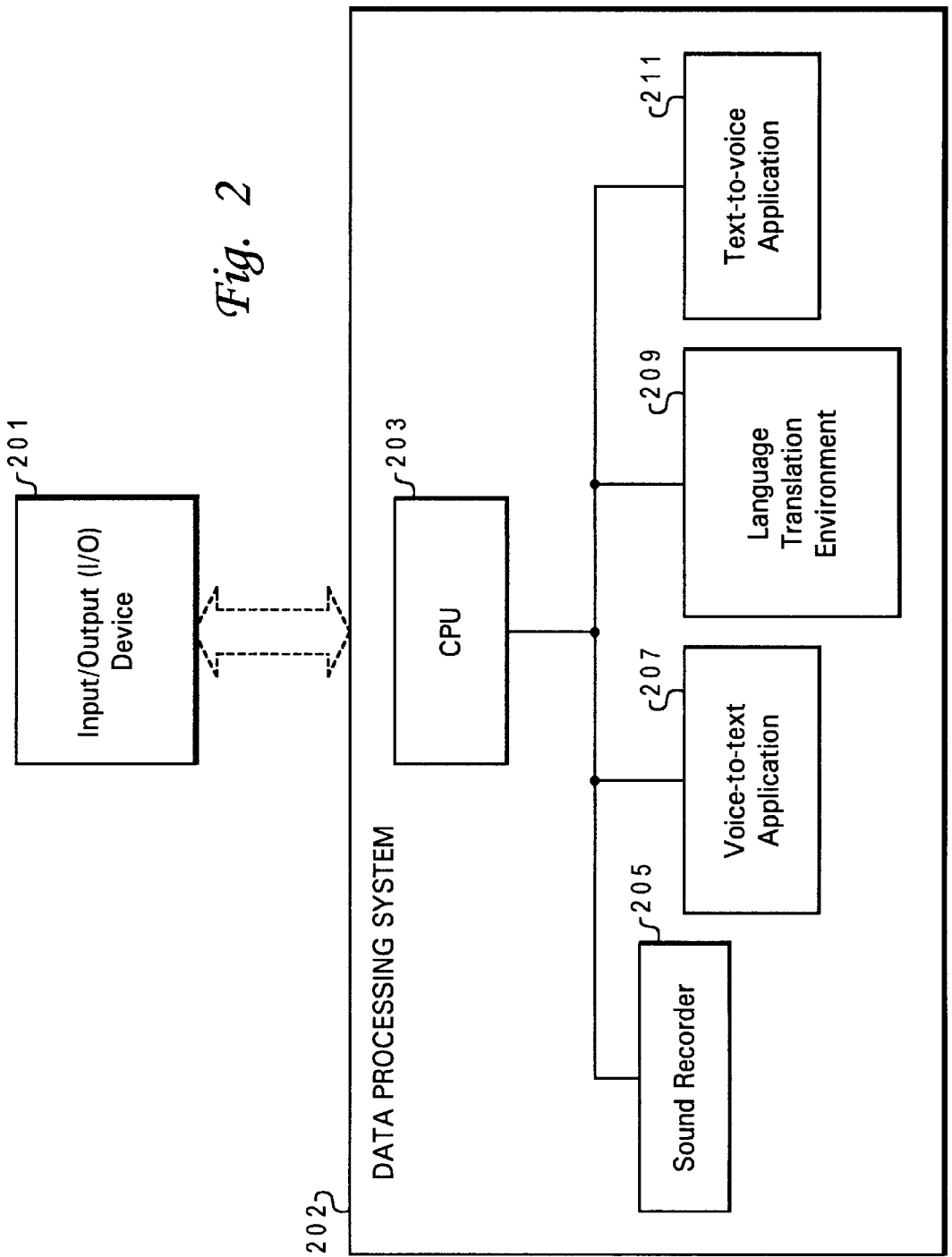
FIG. 2 is a block diagram depicting the hardware (and software) components in accordance with the preferred embodiment of the present invention.

Returning now to the figures, FIG. 2 depicts the preferred hardware/software components utilized to implement the invention. Input/Output (I/O) device 201 serves several functions. I/O device 201 is the voice capture device which captures the initial human utterance desired to be translated. I/O device 201 also communicates with the server, sending and receiving the language data in audio and/or text form. In the preferred embodiment, I/O device 201 is capable of sending audio form and of receiving both text and audio form of human language. Transmission of signals may be by landline communication or wireless depending on the hardware of I/O device 201. In the preferred embodiment, I/O device 201 transmits wireless signals to permit maximum portability. I/O device 201 may be designed solely for speech translations or may be a modified phone or cell phone.

Server 202 is equipped with one or more central processing unit(s) (CPU) 203 which determines the processing of the received human language information. CPU 203 controls the software components of the invention. In the preferred embodiment, these components are resident on server/data processing unit storage location. They include a voice recorder 205 which records the incoming human speech in analog/digital form; a voice-to-text application 207 such as IBM's Via Voice which creates a text file from the sound output of voice recorder 205. Components further includes a language translation environment 209 capable of translating the human language into the desired language. Language translation environment 209 may be resident on server or alternatively may be available from an extended source such as via an Internet based translation environment as is done on AltaVista's language translation site. Outputting in audio form requires a text-to-voice application 211 which converts the desired language text into an audio output for sending to I/O device 201. CPU 203 messages I/O device 201 after processing by voice-to-text application to provide a confirmation of the text to be translated. Software components are equipped with their necessary hardware components, for example, a voice synthesizer is provided for text-to-voice applications. These hardware components are connected to server externally or built-in internally.

In one embodiment of the present invention, the speech capture device further completes the process of voice recognition. The device is equipped with the capabilities to convert the user's speech into text form. The text data is then transmitted to the server for translation. It is understood by those skilled in the art that many more representations are possible with regards to the location of the various subcomponents of the invention. Those skilled in the art will further appreciate that all such representations are covered within the scope of the invention.

FIG. 3 depicts the logic flow of the processing involved in the illustrative implementation of the present invention. The process begins (step 300) when a speaker input is received at speech input device (step 301). Speech input is received in a first language ($L_1$). An analysis is made to determine if voice capture device has local recording capabilities (step 303). If local recording capabilities exists, a sound file is created and transmitted to server (step 304). If however, local recording capabilities does not exist, the speech signal is transmitted to the server and the server produces the sound file (step 305). $L_1$ speech is then converted to $L_1$ text (step 307) in a speech to text environment. Following, a check is made to determine if the speech input device can display text (step 309A). If it can, then the converted text is sent to and displayed on the speech input device for verification (step 311). If not, the server sends the text to be processed into speech and outputs the speech to speech input device (step 313) so that the requester can verify its accuracy. Another check is made at the speech input device for the accuracy of speech in $L_1$ (step 317). If the converted text is not accurate, then adjustments are made to the text to ensure its accuracy. When $L_1$ is not accurate, the process permits additional input via user interface to correct the server's rendition or conversion of speech in $L_1$ (step 315). Those skilled in the art are familiar with the voice editing commands and features which exist in voice recognition technology as implemented in IBM's ViaVoice.

When the text is accurate, the process then implements machine language conversion software to convert text in $L_1$ to text in language 2 ($L_2$) (step 319). The translated text in $L_2$ is then converted to speech in $L_2$ (step 321) within a text-to speech environment. A check is then made to determine if the speech input device can display textual output (step 309B). If speech input device cannot display text, then an audio output of the translated speech in $L_2$ is outputted (step 323A) on speech input device. If, however, the device can display text, then both an audio output and a text output of $L_2$ is provided (step 323B) on speech input device. Then the process ends (step 325).

While the invention has been particularly shown and described with reference to a preferred embodiment, it will be understood by those skilled in the art that various changes in form and detail may be made therein without departing from the spirit and scope of the invention.

What is claimed is:

1. A method for dynamically providing language translations of a human utterance from a first human language into a second human language, said method comprising:

capturing said human utterance in a first human language utilizing a speech input device;

linking said speech input device to a server, said server comprising software enabled language translation capability and a speech recognition capability to convert audio signals to text;

selecting a second human language for said first human language to be translated into, wherein said selecting automatically chooses a second human language associated with a geographic location of said speech input device utilizing a GPS location that is provided by a GPS component of said speech input device and said second human language is utilized unless another second human language is selected by a user of said speech input device;

transmitting said captured human utterance along with an indication of said selected second human language to said server;

converting said captured human utterance into text utilizing said speech recognition capability of said server;

instantiating the translation of said text from said first human language into said second human language; and providing an output of said captured human utterance in said second human language.

2. The method of claim 1, wherein said capturing step further includes the steps of:

converting said speech input into text form utilizing a speech recognition capability of said speech input device; and providing said text as input data to said server.

3. The method of claim 1, wherein said speech input device utilized in said capturing step is a device capable of capturing human speech in audible form and outputting human speech in both text form and audible form, said method further comprising:

displaying a text version of said human speech in said second human language; and broadcasting said audio output in said second human language.

4. The method of claim 1, wherein said speech input device utilized in said capturing step comprises telephonic devices including phones and cellular phones, wherein said linking step to said servers is implemented via access phone numbers which connect directly to said servers, and further wherein said output is provided in audio form to the user via said telephonic devices.

5. The method of claim 1, wherein said transmitting step further includes the steps of:

determining via said GPS component said geographic location of said speech input device;

selecting the local language of the geographic location as said second human language;

prompting a user of said speech input device whether the geographically-selected second human language is correct, wherein said user is provided options for choosing another desired second human language; and when said user does not choose another second human language, setting said local language as a default language for the translation.

6. The method of claim 1, said transmitting step further includes:

converting said captured first human language into a sound file;

re-recording said sound file in high fidelity to enhance accurate recognition; and storing said sound file within a memory location of said data processing system after transmittal to said server is completed.

7. The method of claim 1, wherein said converting step includes the step of prompting a user of said language device with a preliminary output of a converted text form of the human utterance to permit said user to correct any errors in said converted text prior to its translation.

8. The method of claim 1, wherein:

said instantiating step further includes the step of invoking text based language translation software to produce text in said second human language; and said providing step allows a plurality of output formats determined by output device hardware capabilities, said output formats including:

displaying output in textual form on a display device; and audibly outputting said converted human utterance in said desired human language by converting said textual form into audio.

9. The method of claim 8, said outputting step further includes:

first generating an audio representation of said textual form of the converted text utilizing text-to-voice software; and sending said audio representation to an audio output device.

10. A system for dynamically providing language translations of a human utterance from a first human language into a second human language, said system comprising:

a GPS-enabled speech input device utilized to capture human speech input;

a server created from components including a data processing system equipped with software enabled language translation capability and speech recognition capability to convert an audio output of said speech input device;

means for capturing said human utterance in a first human language utilizing said speech input device;

means for linking said speech input device to said server;

means for selecting a second human language for said first human language to be translated into, wherein said selecting automatically chooses a second human language associated with a geographic location of said speech input device utilizing a GPS location that is provided by a GPS component of said speech input device and said second human language is utilized unless another second human language is selected by a user of said speech input device;

means for transmitting said captured human utterance to said server;

means for converting said captured human utterance into text utilizing said speech recognition engine of said server;

means for instantiating the translation of said text from said first human language into said second human language; and means for providing an output of said captured human utterance in said second human language.

11. The system of claim 10, wherein said capturing means is further includes:

means for converting said speech input into text form utilizing a speech recognition capability of said speech input device; and means for providing said text as input data to said server.

12. The system of claim 10, wherein said speech input device utilized in said capturing means is a device capable of capturing human speech in audible form and outputting human speech in both text format and audio format, said system further comprising:
   means for displaying a translated text version of said human speech in said second human language; and
   means for broadcasting said audio output in said second human language.

13. The system of claim 10, wherein said speech input device utilized in said capturing means includes telephonic devices, wherein said linking means to said servers is implemented via access phone numbers which connect directly to said servers, and further wherein said output is provided in audio form to a user via said telephonic devices.

14. The system of claim 10, wherein said transmitting means further includes:
   means for sending a geographical marker of the origination point of said human utterance utilizing global positioning system (GPS) data when said speech input device is portable and equipped with GPS technology;
   means for determining the local language of the geographical location; and
   means for setting said local language as the default language for the desired translation.

15. The system of claim 10, said transmitting means further includes:
   means for converting said captured first human language into a sound file;
   means for re-recording said sound file in high fidelity to enhance accurate recognition; and
   means for storing said sound file within a memory location of said data processing system after transmittal to said server is completed.

16. The system of claim 10, wherein said converting means includes means for prompting a user of said language device with a preliminary output of a converted text format of the human utterance to permit said user to correct any errors in said converted text prior to its translation.

17. The system of claim 10, said outputting means further includes:
   means for first creating an audio representation of said converted text utilizing text-to-voice software; and
   means for sending said audio representation to an output device.

18. A computer program product for dynamically providing language translations of a human utterance from a first human language into a second human language, said computer program product comprising:
   a storage medium; and
   program instructions stored on said storage medium for:
      capturing said human utterance in a first human language utilizing a speech input device;
      linking said speech input device to a server comprising software enabled speech recognition capability and language translation capability;
      selecting a second human language for said first human language to be translated into, wherein said selecting automatically chooses a second human language associated with a geographic location of said speech input device utilizing a GPS location that is provided by a GPS component of said speech input device and said second human language is utilized unless another second human language is selected by a user of said speech input device;
      transmitting said captured human utterance to said server;
      receiving from said server an output of said captured human utterance in said second human language; and
      outputting said captured human utterance in said second human language.

19. The computer program product of claim 18, wherein said program instructions for said capturing step further includes program instructions for:
   converting said speech input into a text signal on said speech input device, and transmitting said text signal as input data to said server.

20. The computer program product of claim 18, wherein said speech input device utilized in said capturing step is a device capable of capturing human speech in audible form and outputting human speech in both text form and audible form and comprises telephonic devices, wherein said linking step to said servers includes dialing in to said server vias an access phone number, and providing said output in audio form to said telephonic devices.

21. The computer program product of claim 18, wherein said program instructions for said transmitting step further includes program instructions for:
   sending to said server a geographical marker of the origination point of said human utterance determined via global positioning system (GPS) data obtained from said speech input device equipped with GPS technology, wherein said server includes logic for determining a local language based on said GPS data and setting said local language as said second human language.

22. The computer program product of claim 18, wherein said program instructions for said transmitting step further includes program instructions for:
   converting said captured first human language into a sound file;
   re-recording said sound file in high fidelity to enhance accurate recognition; and
   storing said sound file within a memory location of said data processing system after transmittal to said server is completed.

23. The computer program product of claim 18, wherein said program instructions for said transmitting step includes program instructions for prompting a user of said language device with a preliminary output of the converted text form of the human utterance to permit said user to correct any errors in said converted text prior to its translation.

24. The computer program product of claim 18, wherein said program instructions for said instantiating step further includes program instructions for invoking text based language translation software to produce text in a desired language.

25. The computer program product of claim 18, wherein said program instructions includes program instructions for providing a plurality of output formats determined by output device hardware capabilities, said output formats including:
   displaying output in textual form on a display device; and
   audibly outputting said translated human utterance in said desired human language.

26. The computer program product of claim 25, said program instructions for said outputting step further includes program instructions for:
   first creating an audio representation or sound file playable on an audio device of said textual form of said converted text utilizing text-to-voice software; and
   sending said audio representation to an output device.

27. The computer program product of claim 18, further comprising program instructions for:

determining the local language of the geographical location; and setting said local language as the default language for the translation.

28. A computer program product for completing language translations of received speech input comprising:

receiving from a remote device a human utterance in a first human language desired to be translated along with at least one language indicator;

selecting a second human language for translating said first human language utilizing said language indicator, wherein a local language corresponding to a GPS location of the remote device transmitted with said language indicator is dynamically selected as said second human language when no user-desired language is indicated by said language indicator; and instantiating translation of said first human language into said second human language; and upon completion of said translation, transmitting a translated version of said human utterance in said second human language to said remote device.

29. The computer program product of claim 28, wherein said transmitting step includes program instruction for transmitting both an audio and text version of said human utterance in said second human language for outputting at said remote device.

30. The computer program product of claim 28, wherein said receiving step includes program instructions for:

determining said local language of said geographic location; and when said language indicator provides a user-desired second human language, utilizing said user-desired second human language in place of said local language.

\* \* \* \* \*